United States Patent [19]

Sousek

[11] Patent Number: 4,566,256
[45] Date of Patent: Jan. 28, 1986

[54] SAFETY INTERLOCK MECHANISM FOR CORN HEAD ASSEMBLY

[75] Inventor: Eugene A. Sousek, Appleton, Wis.

[73] Assignee: Piper Industries, Inc., Dallas, Tex.

[21] Appl. No.: 531,151

[22] Filed: Sep. 9, 1983

[51] Int. Cl.$^4$ ............................................. A01D 45/02
[52] U.S. Cl. ........................................... 56/10.2; 56/98;
  56/DIG. 15; 474/115; 474/117; 198/856
[58] Field of Search .................. 56/10.2, DIG. 15, 98,
  56/119; 474/101, 115, 117; 198/718, 719, 856

[56] References Cited

U.S. PATENT DOCUMENTS

| | | | |
|---|---|---|---|
| 2,230,745 | 2/1941 | Eiselstein | 198/856 |
| 3,680,685 | 8/1972 | Halton | 198/856 |
| 3,905,473 | 9/1975 | Jones et al. | 198/718 |
| 4,106,270 | 8/1978 | Weigand et al. | 56/98 |
| 4,199,924 | 4/1980 | Eistert et al. | 56/98 |
| 4,335,565 | 6/1982 | Knepper et al. | 56/10.2 |

Primary Examiner—John J. Wilson
Assistant Examiner—David I. Tarnoff
Attorney, Agent, or Firm—King, Liles & Schickli

[57] ABSTRACT

A safety interlock system for mounting on the support assembly of a row-crop harvester is provided to protect against damage from a loose or broken gathering member being drawn into the chopper of the harvester. Specifically, the system includes a guide sprocket mounted on an idler arm that is urged by spring means to tension the gathering member. If the gathering member is loose or breaks, the idler arm swings forward under the force of the spring. A linkage, connected to the idler arm, moves in response thereto and interacts with a finger lever to activate a switch. Activation of the switch energizes an interrupter means, such as an electronic clutch, that interrupts the drive to the gathering member. The switch is protected from damage, dirt and debris by being mounted away from the gathering member within a compartment in the support assembly.

3 Claims, 5 Drawing Figures

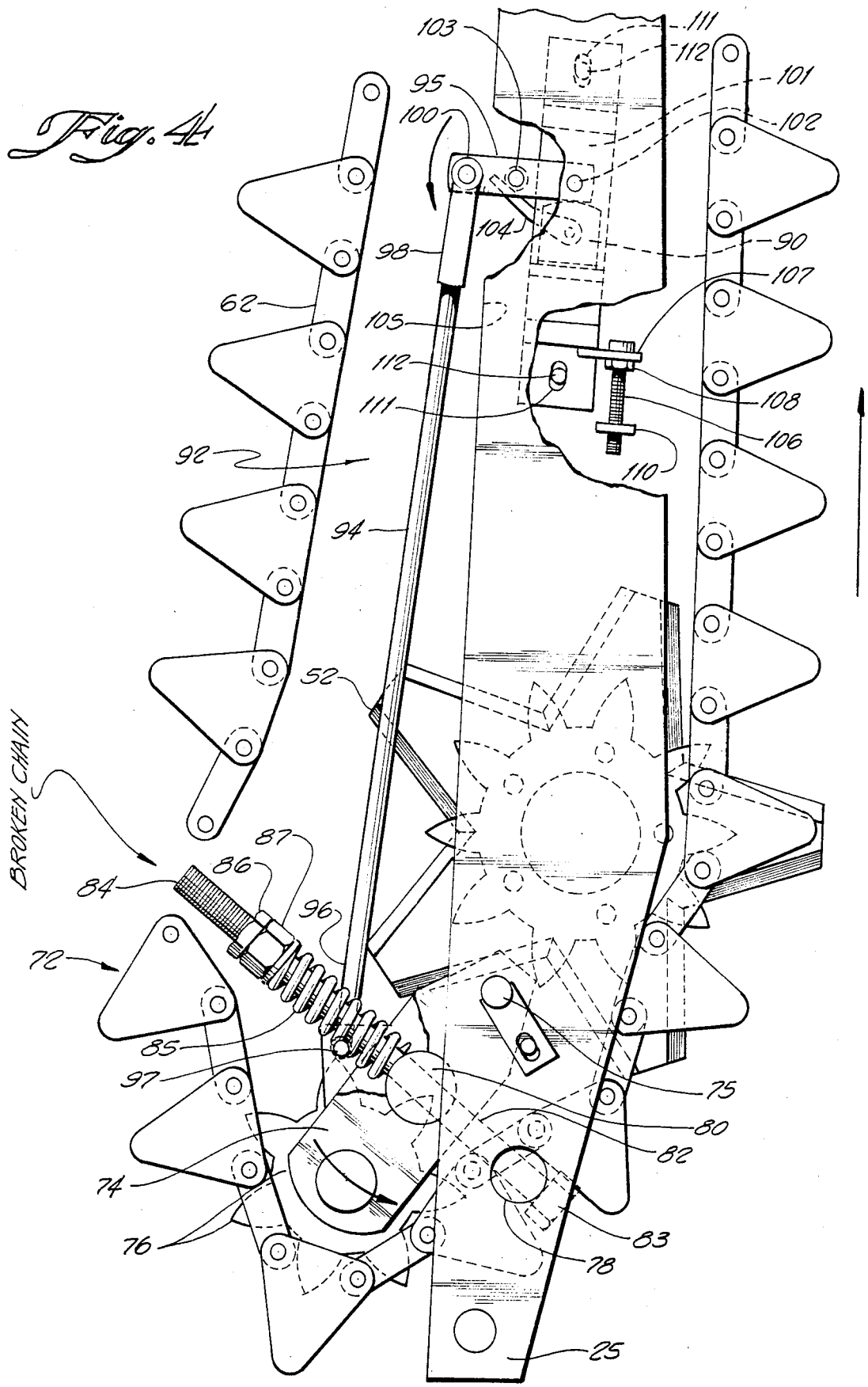

SAFETY INTERLOCK MECHANISM FOR CORN HEAD ASSEMBLY

TECHNICAL FIELD

The present invention relates generally to harvesting apparatus for row crops, and more particularly to a safety interlock system for a crop gathering and conveying apparatus on a support assembly of a row-crop harvester.

BACKGROUND ART

It is known to use multiple row harvesting heads in a harvesting apparatus, such as shown in the co-pending U.S. patent application of Eugene A. Sousek, Ser. No. 419,482, entitled Harvester Head Assembly. This state of the art equipment enables simultaneous harvesting of crops from multiple rows greatly increasing the efficiency of operation.

Typically, each multiple row head assembly includes a plurality of row units defining inlets to the harvester. Each row unit includes adjacent left and right endless gathering members driven by sprockets mounted on a support assembly. The gathering members convey the forage from a cutter adjacent the forward end of the row unit to a harvester at the rear end thereof. Should a gathering member break or become so loose as to work its way free of the sprockets over which it extends, it is drawn up into the harvester. There, the gathering member, a metal chain or rubber belt, causes damage by wedging and jamming in the feed rolls and/or chopper mechanism of the harvester. This, of course, results in the shut down of the harvester with the attendant costly down time and repairs. This need for a system that will prevent broken gathering members from being conveyed into and damaging the harvester has been identified in the past and attempted to be solved by others.

One attempt at solving the above-identified problem is found in Eistert et al. U.S. Pat. No. 4,199,924. In Eistert, a pressurized fluid cylinder is utilized to urge an idler sprocket away from a drive sprocket and tension the gathering member. The cylinder is equipped with a pressure responsive switch or valve that interrupts the harvester drive when the pressure in the cylinder drops below or exceeds a certain pressure range. Additionally, when the gathering member stretches beyond a certain limit or breaks, an arm connected to the cylinder rod is urged by the cylinder to engage and activate a micro-switch. Activation of the micro-switch causes interruption of the harvester drive by a clutch or other means suspending power to the drive sprocket, thereby preventing the chain from being conveyed into and damaging the harvester.

The Eistert apparatus, however, suffers from a number of deficiencies. It is quite complicated and expensive, relying on a series of blocking, checking and regulating valves in the pressurized lines between the cylinder and a pressurized fluid source. The apparatus is also expensive to manufacture and, as characteristic of pressurized systems, expensive to maintain. A leak or malfunction in any of the components renders the harvester inoperable due to loss of tension in the gathering chain. Additionally, repairs are difficult as each component must be separately checked to determine the source of the problem.

Further, Eistert's device is quite cumbersome. The pressure cylinder, multiple pressure lines and pressurized fluid source occupy a large area of the support assembly. In fact, the space requirements are such that the crop gathering and conveying apparatus must be designed around the Eistert device. There simply is no way to retrofit the Eistert system into row-head assemblies presently in production without a complete redesign. Also, the additional weight of the Eistert detecting system not only leads to increased fuel consumption but also causes accelerated metal fatigue of the mounts between the harvester and head assembly; a condition exacerbated by the cantilever fashion of mounting, the vibration from the rotating gathering members and the bumpy terrain over which the harvester travels.

Additionally, the slide connecting the cylinder to the idler sprocket in Eistert is subject to bending under the forces acting upon it through the gathering chain as the chain collects and conveys forage. Any bending that takes place compromises the efficient and effective operation of the Eistert system. There is thus a need for a crop gathering and conveying apparatus safety interlock system that is inexpensive to manufacture, repair and maintain. One that is small, lightweight and durable. A safety interlock system providing both improved efficiency and reliability.

DISCLOSURE OF THE INVENTION

Accordingly, it is a primary object of the present invention to provide an improved safety interlock system for a crop gathering and conveying apparatus of a row crop harvester overcoming the above-described limitations and disadvantages of the prior art.

It is an additional object of the present invention to provide a safety interlock system avoiding unnecessary complications of design and construction while yielding improved efficiency and reliability in operation.

It is still another object of the invention to provide a small, lightweight safety interlock system having improved durability.

It is a still further object of the invention to provide a safety interlock system that is less expensive to manufacture and maintain, as well as easier to repair.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved safety interlock system is provided for interrupting the power to the crop gathering and conveying apparatus of a row-crop harvester in response to excessive stretching or the breaking of the gathering member. The power interruption insures that the loose or broken gathering member is not conveyed into the harvester where it would cause damage to the feed rolls or chopper mechanisms.

The apparatus of the invention includes an idler arm and guide means pivotally mounted to the support assembly of the row crop harvester, a corresponding endless gathering member engaged over the guide means, a means for driving the gathering member, and spring means for urging against the idler arm and tensioning the gathering member. Additionally, the inventive apparatus includes a circuit and interrupter means. The circuit means includes a safety switch responsive to the movement of the idler arm. The interrupter means, such as an electronic clutch, is controlled by the safety switch to interrupt power from the drive means. When the gathering member breaks or stretches excessively, the spring means urges the idler arm and connected guide means to a point where the safety switch of the circuit means is activated. With this activation, the interrupter means interrupts power from the drive means, thereby insuring that the loose or broken gathering member is not conveyed into the harvester where it would damage the feed rolls or chopper mechanisms.

The safety switch of the circuit means is advantageously located in a hollow compartment within the support assembly. There the switch is free from dirt and debris and protected from battering by the crop as the crop is conveyed up the support assembly by the gathering members. Additionally, a linkage means, such as a tie rod and pivotally mounted actuator lever, is provided to connect the switch to the idler arm. This feature allows the safety switch to be mounted away from the idler arm, within the support assembly back closer to the harvester vehicle. Thus, the switch is mounted in a more secure position where it is substantially protected from outside forces.

The safety switch of the invention may be mounted to the support assembly by means of a bracket. The bracket is slidable along the support assembly. This allows sensitivity adjustment to guarantee proper functioning of the interlock system even when the gathering member stretches over long term use. Additionally, this feature is invaluable during routine maintenance and replacing of the gathering members as it allows for proper sensitivity adjustment despite length variations from one member to another. Further adjustment is also provided. Specifically, the spring means connected to the idler arm is provided with means for adjusting the tension of the gathering member. Together, the above adjustments provide the means necessary to properly adjust and fine tune the operation of the safety interlock system and assure the operator of efficient and reliable performance.

The simple structure of the present invention provides a safety interlock system of low manufacturing costs and maintenance free operation. Spring means are provided to tension the idler arm, thereby relieving the need for a pump, cylinder and associated pressure lines as in the prior art. The safety switch of the invention is protected within the support assembly from dirt and debris, as well as from buffeting by the crop being conveyed by the gathering member. The switch is also located near the harvester vehicle where it is not so susceptible to the jarring motion and vibration of the support assembly. Consequently, the interlock system of the present invention provides improved efficiency, reliability and durability at a lower cost.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 4 is an enlarged top view of the apparatus shown in FIG. 3 wherein the endless gathering member is broken and the interlock system activated; and FIG. 5 is a schematic diagram illustrating the operating circuit of the safety interlock system according to this invention.

Reference will now be made in detail to the present preferred embodiment of the invention, an example of which is illustrated in the accompanying drawings.

BEST MODE OF CARRYING OUT THE INVENTION

Figure 1:
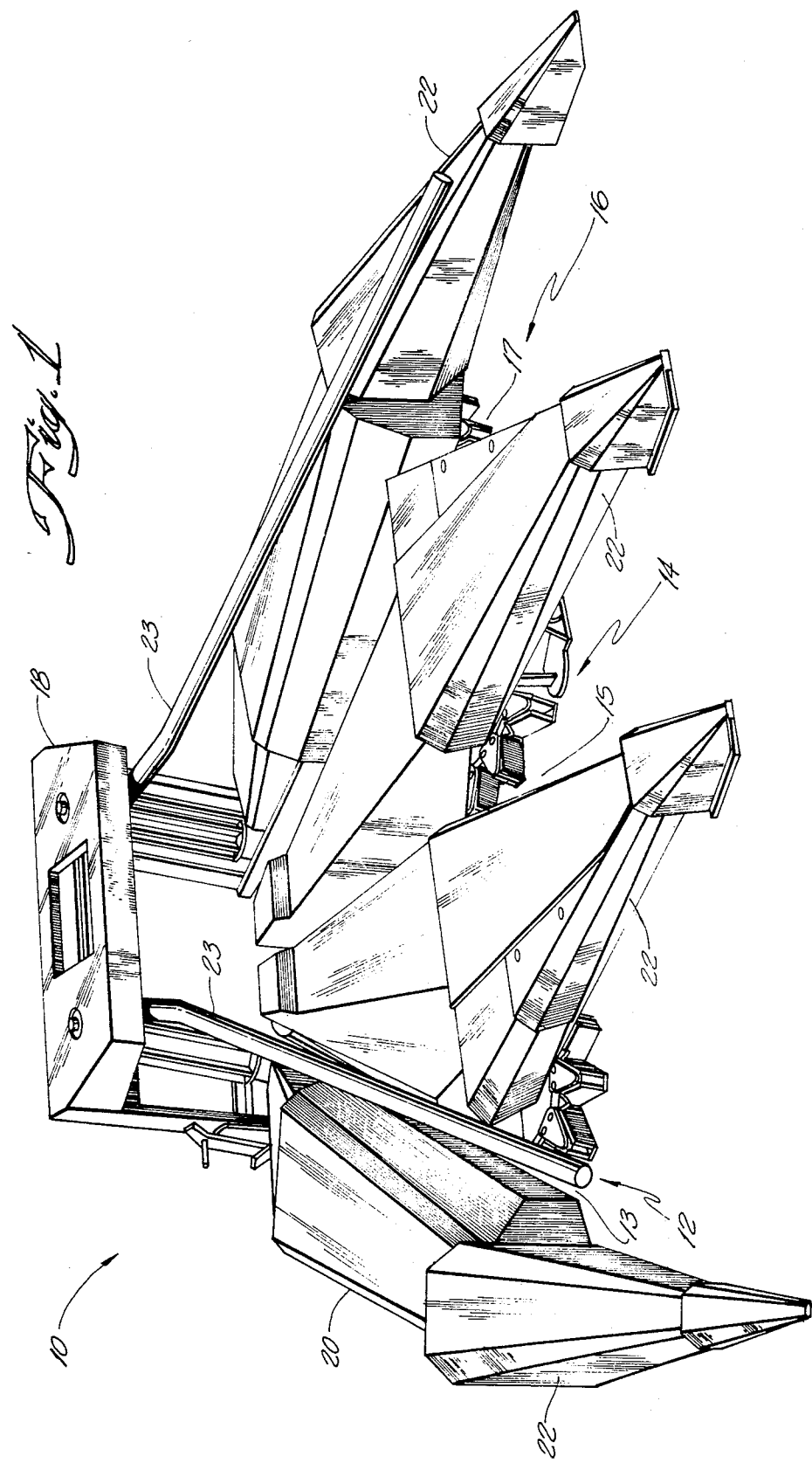
FIG. 1 is a perspective view of a multi-row head assembly including a crop gathering and conveying apparatus mounted on a support assembly.

Reference is now made to FIG. 1 showing a crop gathering and conveying apparatus on a support assembly of a row-crop harvester. The apparatus includes a number of row units or modules 12, 14 and 16, having inlets 13, 15 and 17, respectively, adjustably spaced with respect to one another. A head base 18 is shown as providing support for the multiple row units and for attachment to a harvester vehicle (not shown). An adjustable sheet metal covering structure 20 generally provides hoods and snouts 22 for covering the various components of the row units and for guiding the crops toward the inlets thereof. Additionally, guide bars 23 are provided adjacent each of the outer row units of the apparatus. Guide bars 23 retain and laterally support the stalks during passage through the outer row units to the harvester inlet openings.

Figure 2:
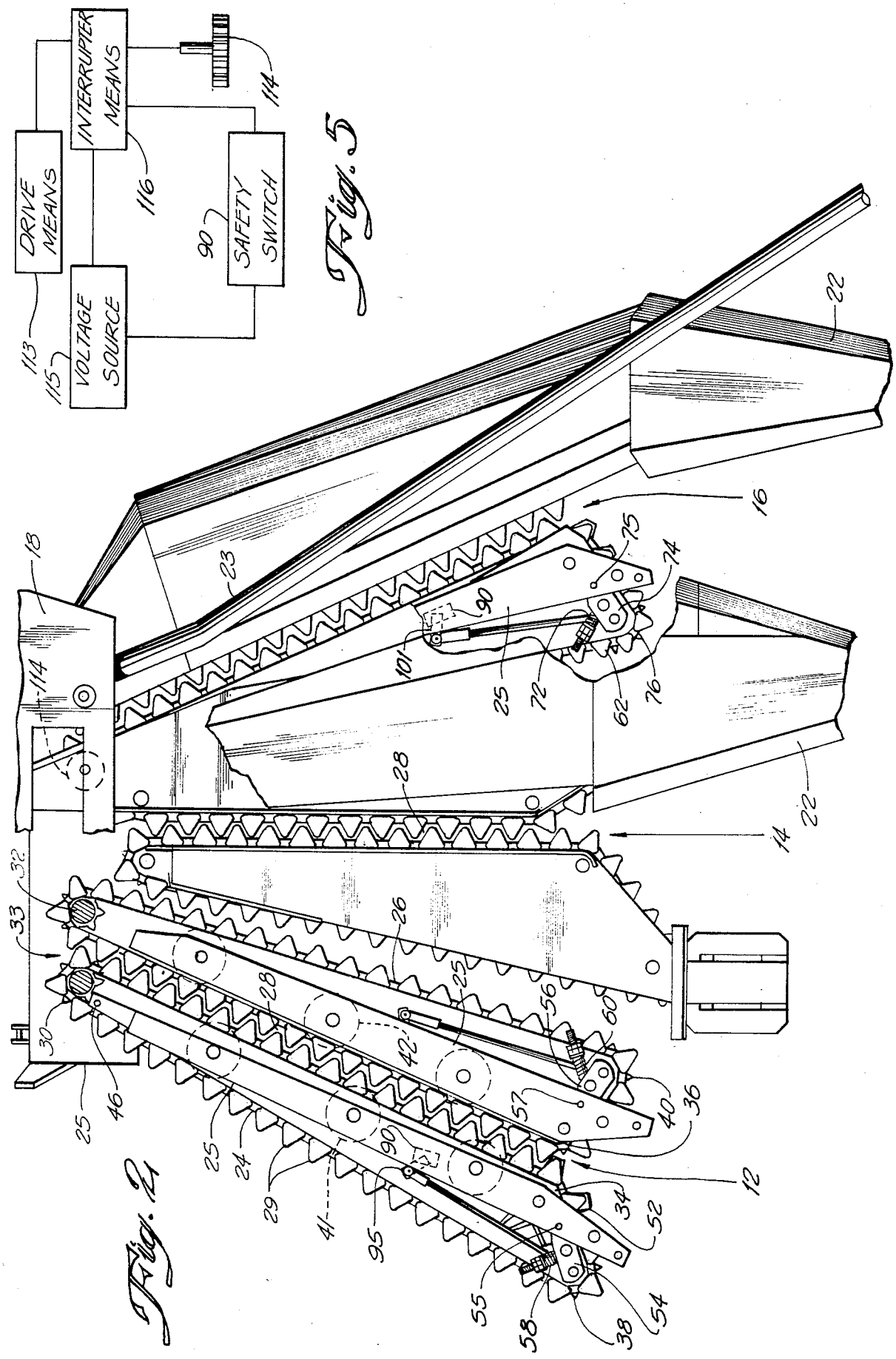
FIG. 2 is a top view of the multi-row head assembly of FIG. 1 having some of the covering sheet metal thereof removed.

Referring now to FIG. 2, there is shown a top view of the apparatus of FIG. 1 wherein the sheet metal is partially removed. As shown, three row units are included, the central row unit 14 being maintained at a fixed location, while the two outer units (left and right) 12, 16 may be adjustable to be variably spaced relative to the central unit 14.

As seen from viewing FIG. 2, row unit 12 includes a pair of gathering members 24, 26 mounted to support assembly 25. The gathering members are used for gathering the crops being harvested and cooperate to form a passageway 28 therebetween. The gathering members 24, 26 are shown as endless chains having a plurality of lugs 29 disclosed thereon. It should be appreciated, however, that flexible belts may be used for the same purpose.

The gathering members 24, 26 are driven by driving sprockets 30, 32 respectively. The members engage these driving sprockets 30, 32 at the discharge end 33 of passageway 28. Driven sprockets 34, 36 are mounted at the forward or inlet end of row unit 12 to direct gathering members 24, 26, respectively. Additionally, guide means in the form of idler sprockets 38 and 40 are provided for tensioning the respective gathering members 24, 26. Also, other idler sprockets may be provided for maintaining the gathering members in appropriate alignment and position to form the passageway 28 between the members. Two series of idlers 41 and 42 are illustratively labeled for that purpose. The driven sprockets 34, 36, idlers 41, 42, and guide sprockets 38, 40 are all carried on support assembly 25.

As is well known in the art, rotary cutters 52 are provided at the inlet or mouth of each row unit 12, 14, 16. Each rotary cutter 52 cooperates with a stationary cutting knife (not shown) for severing the stalks of the crop being harvested. The severed forage is then gripped by the gathering members of each row, illustrated by chains 24, 26 for unit 12, and transported rearwardly and upwardly to the discharge end 33 of passageway 28. It is recognized that subsequent to severing by the rotary cutter 52, substantially all the harvested forage extends above the gathering members 24, 26 ready to be fed cutend first into the harvester.

As can further be seen from viewing FIG. 2, guide sprocket 38 is mounted on idler arm 54 which is pivotally mounted to support assembly 25 at pin 55. Similarly, guide sprocket 40 is mounted to idler arm 56 which is pivotally mounted to support assembly 25 at pin 57. Spring means 58 urges against idler arm 54 so as to tension gathering member 24, just as spring means 60 urges against idler arm 56 to tension gathering member 26. It should be appreciated that a similar tensioning mechanism, as is well known in the art, is provided for each additional gathering member of row units 14 and 16. Such a tensioning mechanism for row unit 16 and gathering member 62 including idler arm and sprocket 74, 76 is shown in FIG. 2, and in detail in FIGS. 3 and 4. It should thus be understood that the broad principals of the present invention are susceptable to embodiment in various arrangements with the idler arm, such as idler arms 54, 56, 74, mounted in different locations. Thus, virtually any harvester head can be adapted for the safety interlock system of the invention with a minimum of change or adaption.

Figure 3:
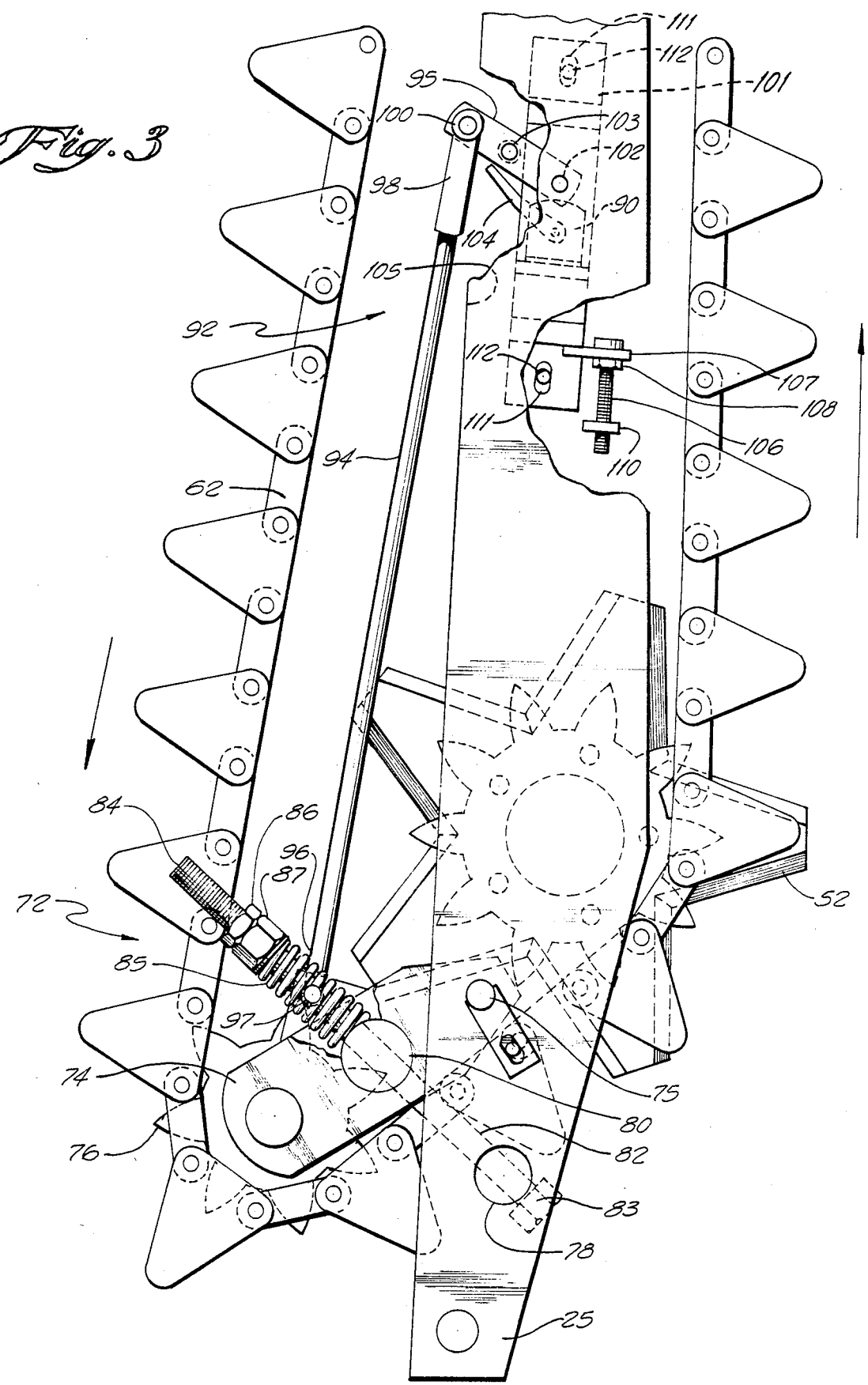
FIG. 3 is an enlarged top view of a single pivotally mounted idler arm and guide means and cooperating gathering member, wherein the endless gathering member is in proper operating condition.

The details of the improved safety interlock system of the present invention can be best viewed by reference to FIGS. 3 and 4 and the tensioning mechanism of the row unit 16, as one example. Spring means, generally designated by reference number 72, urges against idler arm 74 which pivots about pin 75 and forces guide sprocket 76 out against gathering member 62 to tension the same. Spring means 72 is an assembly including mounting post 78 connected to support assembly 25 and stop peg 80 connected to idler arm 74. A support rod 82 passes through apertures in the post 78 and peg 80. The rod 82 includes a head end 83 and a threaded end 84. The head end 83 abuts the post 78 and is enlarged so as not to pass through the aperture therein. Spring 85 encircles the rod 82 adjacent threaded end 84 and a pair of locking adjustment nuts 86 and 87 are screwed onto the threaded end 84 to compress the spring against the stop peg 80. A pair of nuts are preferable as they tend to lock each other and prevent inadvertant changes in the positioning of the nuts under normal operating conditions. The nuts 86, 87 allow adjustment of the tension in the gathering member 62. As the adjusting nuts are screwed onto the rod 82, the greater the force the spring exerts on the stop peg 80. This force pivots idler arm 74 about pin 75 (counterclockwise in FIG. 3) to urge guide sprocket 76 against the gathering member 62 and retain that member under the proper tension.

To assure proper geometry as the idler arm 74 pivots, mounting post 78 and stop peg 80 are rotatably connected to support assembly 25 and idler arm 74, respectively. The rotation takes place about respective spaced axes perpendicular to the support assembly 25 and idler arm 74. This mounting assures smooth, reliable and efficient pivotal movement of the idler arm 74 and thus continuous, proper tensioning of the gathering member 62.

The safety interlock system of the present invention further includes circuit means comprising a safety switch 90 responsive to the movement of the idler arm 74. The switch 90 is connected to the idler arm 74 by means of a linkage generally designated by reference numeral 92. The linkage means 92 includes a tie rod 94 and actuator lever 95. As can be seen, a first end 96 of tie rod 94 is connected to the idler arm 74 at point 97. The second end 98 of tie rod 94 is connected to actuator lever 95 at point 100 .

As shown, actuator lever 95 is pivotally connected to bracket 101 about pin 102. The actuator lever 95 includes an actuator peg 103 extending upwardly therefrom between tie rod connecting point 100 and pivoting pin 102. The actuator peg 103 is positioned to contact finger lever 104 of safety switch 90 so that the finger lever is moved in response to the pivoting of actuator lever 95.

Preferably, bracket 101 is slidably mounted to support assembly 25 within an interior space or compartment 105. The mounting of switch 90 on bracket 101 within compartment 105 of support assembly 25 serves to protect the switch from dirt and debris. Additionally, the interior mounting protects the switch 90 from extremes of weather and battering by the crop. Thus, the mounting of switch 90 within the support assembly 25 greatly improves the reliability and increases the service life of the switch.

The slidable mounting of bracket 101 to support assembly 25 allows fine sensitivity adjustment of the safety interlock system. Specifically, adjustment screw 106 is connected to bracket 101 by means of flange 107. Flange 107 includes an aperture through which screw 106 extends. A nut 108 is tightened to flange 107 to secure the screw in place once the adjustment is made. A block 110, attached to support assembly 25, such as by welding, includes an aperture for receiving the threaded end of screw 106. This arrangement allows movement of the bracket 101 relative to support assembly 25 by means of adjustment screw 106. As adjustment screw 106 is rotated through block 110, bracket 101 moves relative to the peg 103 to change the system sensitivity. The bracket 101 remains in proper alignment as slots 111 are provided for slidably receiving guide pins 112.

When gathering member 62 is in proper operating condition, the safety interlock system of the present invention is in the orientation shown in FIG. 3. Spring means 72 is urging idler arm 74 outwardly to apply the proper tension to gathering member 62. Tie rod 94, connected idler arm 74 to actuator lever 95, is holding actuator lever 95 and more specifically, actuator peg 103 away from finger lever 104 of switch 90 so that the finger lever is maintained in a first, unactivated position.

When the gathering member 62 stretches past a certain limit or breaks as shown in FIG. 4, idler arm 74 is urged to pivot outwardly and away from switch 90 by spring means 72. As idler arm 74 pivots tie rod 94, this causes actuator lever 95 to pivot about pin 102. This pivoting motion causes actuator peg 103 to contact and rock finger lever 104 forward into a second, activated position. Once activated, the switch remains activated by the force of the spring 85 thus interrupting power from the drive means 113 to driven sprocket 114.

As shown in the schematic circuit diagram in FIG. 5, the activation of switch 90, due to the breaking of gathering member 62 and resulting outward pivoting of idler arm 74, as just described, causes the circuit between voltage source 115 and interrupter means 116 to be completed. When the circuit is completed, the interruption means is made operational and power from the drive means 113 to the driven sprocket 114 is interrupted. The means for interrupting this power may include an electronic clutch energized through activation of the switch 90. It should be recognized, however, that any means capable of stopping transfer of power to driven sprocket 114 could be used.

When replacing a broken gathering member 62, tension in the spring assembly 72 is relieved by loosening locking nuts 86 and 87. The guide means 76 is then freely moved to a position within the path of new gathering member 62 as the gathering member is fed into proper position over the various driven sprockets and idlers along support assembly 25. Next, locking nuts 86 and 87 are tightened until the idler arm 74 is urged by spring means 72 to provide the proper tensioning on gathering member 62 through guide sprocket 76. Finger lever 104 of switch 90 is then returned to the unactivated or first position and any fine tuning of the safety interlock system is performed by adjusting the position of bracket 101 along support assembly 25 as discussed above.

In summary, numerous benefits have been described which result from employing the concepts of the safety interlock system of the present invention. The system is uncomplicated, occupying very little space. Thus, it may be used with idler arms in almost any orientation along the support assembly 25 of a crop gathering and conveying apparatus. Various positions of mounting the safety interlock system of the present invention are seen in FIG. 2. As other specific examples, gathering members 24 and 26 include similar safety interlock systems as shown and described above.

Since the system is less complicated than those previously known in the art, it costs less to manufacture and maintain while being easier to repair. The positioning of the switch 90 within a compartment 105 along support assembly 25 improves the service life and reliability of the switch and thus, the durability of the safety interlock system. In that compartment, the switch is protected from dirt and debris, inclement weather conditions, and battering from the crop being conveyed by the gathering members.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A safety interlock system for a crop gathering and conveying apparatus on a support assembly of a row-crop harvester, comprising:
    a pivotally mounted idler arm and guide means on said support assembly;
    an endless gathering member engaged over said guide means;
    drive means for moving said gathering member;
    spring means urging against said idler arm and tensioning said gathering member;
    circuit means including a safety switch responsive to the movement of said idler arm; and
    interrupter means controlled by said safety switch to interrupt power from said drive means to said gathering member upon movement of said idler arm by said spring means when said gathering member becomes loose or breaks, thereby preventing damage to said harvester from said member;
    said safety switch being connected to said idler arm by linkage means including a pivotally mounted actuator lever engaging said safety switch for activation when said gathering member is loose or broken and a tie rod extending along said support assembly between the actuator lever and the idler arm; said support assembly including an interior compartment, said actuator lever and safety switch being located substantially inside said compartment free from dirt and debris associated with the crop being harvested and protected from damage typically caused by battering from said crop as said crop is transported up said support assembly by said gathering member.

2. The safety interlock system disclosed in claim 1, wherein said safety switch is mounted within said support assembly in said compartment by means of a bracket, said bracket being slidable along said support assembly and further comprising means for adjusting the position of said bracket, thereby providing sensitivity adjustment of said safety interlock system.

3. The safety interlock system disclosed in claim 1, wherein said spring means is provided with means for adjusting the tension on said gathering member.

* * * * *